US008069670B2

(12) United States Patent
Schmahl et al.

(10) Patent No.: US 8,069,670 B2

(45) Date of Patent: Dec. 6, 2011

(54) COMBUSTION CHAMBER WALL

(75) Inventors: Milan Schmahl, Mülheim an der Ruhr (DE); Marc Tertilt, Hattigen (DE)

(73) Assignee: Siemens Aktiengesellschaft, Munich (DE)

( * ) Notice: Subject to any disclaimer, the term of this patent is extended or adjusted under 35 U.S.C. 154(b) by 412 days.

(21) Appl. No.: 12/227,448

(22) PCT Filed: Feb. 22, 2007

(86) PCT No.: PCT/EP2007/051717

§ 371 (c)(1),
(2), (4) Date: Nov. 18, 2008

(87) PCT Pub. No.: WO2007/137883

PCT Pub. Date: Dec. 6, 2007

(65) Prior Publication Data

US 2009/0205314 A1 Aug. 20, 2009

(30) Foreign Application Priority Data

May 31, 2006 (EP) .................................... 06011276

(51) Int. Cl.
*F02C 1/00* (2006.01)

(52) U.S. Cl. ........................................................ 60/753

(58) Field of Classification Search ............ 60/752–757, 60/796–800; 432/248, 249, 252; 431/353
See application file for complete search history.

(56) References Cited

U.S. PATENT DOCUMENTS

| | | | | |
|---|---|---|---|---|
| 4,944,151 | A * | 7/1990 | Hovnanian | 60/800 |
| 5,592,814 | A * | 1/1997 | Palusis et al. | 60/770 |
| 5,624,256 | A * | 4/1997 | Pfeiffer et al. | 432/252 |
| 5,957,067 | A * | 9/1999 | Dobbeling et al. | 110/336 |
| 6,145,452 | A * | 11/2000 | Heger et al. | 110/336 |
| 6,223,538 | B1 * | 5/2001 | Benz et al. | 60/753 |
| 6,341,485 | B1 * | 1/2002 | Liebe | 60/772 |
| 6,786,048 | B2 * | 9/2004 | Tiemann | 60/752 |
| 6,941,758 | B2 * | 9/2005 | Tiemann | 60/752 |
| 2005/0247062 | A1 * | 11/2005 | Jeppel et al. | 60/752 |
| 2006/0037321 | A1 * | 2/2006 | Tiemann et al. | 60/722 |

FOREIGN PATENT DOCUMENTS

| | | | |
|---|---|---|---|
| EP | 0 724 116 | A | 7/1996 |
| EP | 0 895 027 | A1 | 2/1999 |
| EP | 1 533 574 | A1 | 5/2003 |
| EP | 1 389 690 | A1 | 2/2004 |
| EP | 1 477 737 | A2 | 11/2004 |
| EP | 1 533 572 | A1 | 5/2005 |
| GB | 2 380 236 | A | 4/2003 |

* cited by examiner

*Primary Examiner* — Louis Casaregola
*Assistant Examiner* — Phutthiwat Wongwian

(57) ABSTRACT

A combustion chamber wall in a combustion chamber is proposed, The chamber wall has a support structure with a number of heat shield which are attached to the support structure with the aid of a fastening unit. The fastening unit encompasses a spring device which is fixedly connected to the support structure and is composed at least of a spring that is mounted in a jacket. The spring is secured against falling out on the side facing away from the combustion chamber by a first removable retainer. The interior of the spring device is provided with an axial hole for accommodating the fastening unit. The spring is secured against falling out on the side facing the combustion chamber by a second removable retainer. The spring device can be dismounted on the side facing the combustion chamber.

17 Claims, 4 Drawing Sheets

COMBUSTION CHAMBER WALL

CROSS REFERENCE TO RELATED APPLICATIONS

This application is the US National Stage of International Application No. PCT/EP2007051717, filed Feb. 22, 2007 and claims the benefit thereof. The International Application claims the benefits of European application No. 06011276.0, filed May 31, 2006, both of the applications are incorporated by reference herein in their entirety.

FIELD OF THE INVENTION

The invention relates to a combustion chamber wall in a combustion chamber, comprising a support structure with a number of heat shields, which are fastened to the support structure with a fastening means, the fastening means comprising a spring device.

BACKGROUND OF THE INVENTION

The combustion chamber of a gas turbine is exposed to particular loads, for example hot gases or vibrations. For this reason so-called heat shields are mounted on the support structure to protect the support structure from the hot gases and other loads.

Heat shields in a combustion chamber, in particular metal heat shields, are attached to the support structure with a screw. So-called cup-spring assemblies are used here for attachment purposes. Metal heat shield plates are fastened in a central manner using the cup-spring assemblies. The cup-spring assembly consists of a sleeve and cup springs arranged in the sleeve. These have a continuous axial hole on the inside. The cup-spring assemblies have a thread on parts of the axial hole. The screw is screwed into this axial hole. An external thread is positioned on the outside of the cup-spring assemblies, in other words on the sleeve. This is used to screw the cup-spring assembly into the support structure. A recess with a suitable internal thread is provided in the support structure for this purpose. The screw head is then arranged in or on the heat shield. Screwing the screw into the recess fastens the heat shield to the support structure. The screw here can be such that it projects through the cup-spring assembly screwed into the support structure, thereby extending further into the recess in the support structure.

In the direction of the combustion chamber the sleeve has a permanently attached cover, which can also have an axial hole to accommodate the screw. The cover is as it were part of the sleeve. The cup springs therefore do not fall into the combustion chamber. The cup springs of the cup-spring assembly are secured on the side in the direction of the support structure with a securing ring to prevent them falling out. A pressure plate is also arranged between the security ring and the spring. However in the past the security ring has quite often come loose or has fractured. If a heat shield then has to be taken down/mounted due to cracks or fractures, if the security ring is fractured, the springs and pressure plate can themselves fall into the combustion chamber. These must then be located and removed in a time-consuming operation. The mounting of new cup-spring assemblies is also difficult, as the rear face of the support structure is not accessible from the outside at some points, for example at the hub.

SUMMARY OF THE INVENTION

The object of the invention is to specify a combustion chamber wall with a support structure and with heat shields, which are fastened to the support structure, the means of fastening these heat shields to the support structure being particularly user-friendly and easy to mount/take down.

The object is achieved by an inventive combustion chamber wall with a combustion chamber, comprising a support structure with a number of heat shields, which are fastened to the support structure with a fastening means, the fastening means comprising a spring device, the spring device being connected permanently to the support structure, the spring device consisting at least of a spring positioned in a jacket, the spring being secured on the side facing away from the combustion chamber by a first captive securing means to prevent it falling out and the spring device having an axial hole on the inside to accommodate the fastening means and the spring being secured on the side facing the combustion chamber by a second captive securing means to prevent it falling out, it being possible to dismantle the spring device on the side facing the combustion chamber.

In the invention it has been acknowledged that the problems in the prior art are due to the fact that the spring assembly in the prior art cannot be dismantled toward the interior of the combustion chamber. In the event of a fracture of the security ring of the spring assembly in the prior art (e.g. when a heat shield is being taken down/mounted), the cup springs can therefore fall into the combustion chamber, as the cup-spring assembly cannot simply be replaced. Time-consuming location of the individual parts of the assembly is therefore always necessary when a heat shield is being mounted/taken down and in the event of a fracture of the security ring of the spring assembly associated therewith.

The inventive spring device therefore consists of a spring, e.g. a cup spring, which is positioned in a jacket. The spring device has an axial hole on the inside. This is generally arranged in a central manner for regular load distribution and is intended to accommodate the fastening means, for example a screw. The fastening means, for example the screw, is used to fasten the heat shield to the support structure, for example by positioning the screw head in or on the heat shield. The spring device is connected permanently to the support structure. In the inventive device a first captive securing means is attached, which secures the spring in the jacket to prevent it falling out in the direction of the support structure. It can be a type of cover for example. A second captive securing means secures the spring to prevent it falling out in the direction of the combustion chamber. When the heat shields are being taken down and/or mounted, damaged spring devices can therefore be replaced at the same time without any further significant outlay. On the one hand this reduces the risk that when the spring device is damaged, the spring or parts of the spring device itself will fall into the combustion chamber and have to be removed in a time-consuming operation. Also for the combustion chamber itself the risk of unfastened parts in the chamber is reduced.

In a preferred embodiment the at least one spring is a cup spring. This is advantageous as cup springs can absorb very large forces while taking up little space, compared with other springs. A column of any length can also be achieved by assembling a number of cup springs together. With correct dimensioning cup springs also achieve a long useful life with dynamic loading.

Advantageously the first captive securing means is a pressure plate and/or an edge positioned on the inside of the jacket. The springs, in particular the cup springs, can rest on this. This prevents them falling into the combustion chamber. Also—in contrast to the security ring in the prior art—the risk is much lower in the event of a fracture, for example when a heat shield is being taken down/mounted.

The pressure plate is therefore advantageously positioned between edge and spring in the jacket. This also increases the bearing surface of the springs. As a result the springs can absorb the load in a largely constant manner. This can extend the useful life of the springs.

In a preferred embodiment the pressure plate has an internal thread for fastening the fastening means. This can advantageously be embodied as a supporting internal thread, in which the securing means is positioned.

The jacket advantageously has an external thread. This allows simple fastening of the jacket to the support structure.

The jacket preferably has recesses on the side facing the combustion chamber. The projection of the pressure plate is advantageously arranged in these recesses. This allows better connection of the two elements and also secures the pressure plate against misalignment.

The jacket is advantageously a sleeve. This is preferably made of metal or a metal base material or another heat-resistant material. The sleeve is also preferably embodied in such a manner that it permits slight expansion due to the effects of heat. This is the case for example with a metal/metal base material.

A securing sheet is preferably positioned on the spring on the side facing the combustion chamber. The security sheet can hereby be arranged both in the jacket on the spring and outside on the spring. Also with a corresponding thickness the security sheet can be embodied in such a manner that part of the security sheet is arranged inside and part of the security sheet is arranged outside the jacket.

The securing sheet is advantageously connected permanently to the jacket, in that the securing sheet has at least one attachment on the outside. This attachment is arranged for example in the recesses in the jacket. It is thus possible on the one hand for the security sheet to be connected permanently to the jacket. The security sheet is also arranged in such a manner that it cannot be misaligned. This also protects the spring against misalignment. This again increases the useful life of the spring.

In an advantageous embodiment the securing sheet has at least one assembly on the inside. This serves to fasten the securing sheet further.

Preferably at least one tooth is positioned on the securing sheet on the outer edge on the side facing the combustion chamber. If a number of teeth are present, these are positioned in a regular manner over the entire outer edge. In a preferred embodiment at least one bead is impressed on the securing sheet on the outer edge on the side facing the combustion chamber. The at least one tooth or the teeth and the at least one impressed bead prevent the spring device and/or spring rattling, thereby preventing wear due to relative movement. This increases the useful life of the spring device.

A disk is advantageously arranged on the securing sheet on the side facing the combustion chamber.

The disk advantageously has at least one inside recess. The assembly of the security sheet is for example arranged in this recess. This holds these two elements together better. The disk is also secured against misalignment.

The disk preferably has an external thread. The external thread can hereby be embodied as a supporting external thread. The disk, which can be screwed in, also has the advantage of dispensing with the need for subsequent machining at the so-called plate journal to tailor the plate to the support structure, in that the height of the spring device can be adjusted individually.

The fastening means is preferably a screw. This has the advantage that the screw head can be arranged very simply on or in the heat shield. By connecting the screw to the heat shield and the spring device, which is positioned for example in the support structure, it is possible to fasten the heat shield to the support structure in a simple manner.

The spring device is preferably arranged in the support structure for the purpose of fastening a heat shield. A corresponding recess with a corresponding internal thread should therefore be provided in the support structure. This type of fastening has the advantage that it is simple and economical to produce.

The pressure plate preferably has at least one projection. This allows the pressure plate to be fastened more securely in the jacket.

Further features, characteristics and advantages of the invention will emerge from the description of an exemplary embodiment and the further dependent claims.

BRIEF DESCRIPTION OF THE DRAWINGS

The invention is described in more detail below by way of an example with reference to a drawing, which is simplified and not to scale and in which.

Identical parts are shown with the same reference characters in all the figures.

DETAILED DESCRIPTION OF THE INVENTION

Figure 1:
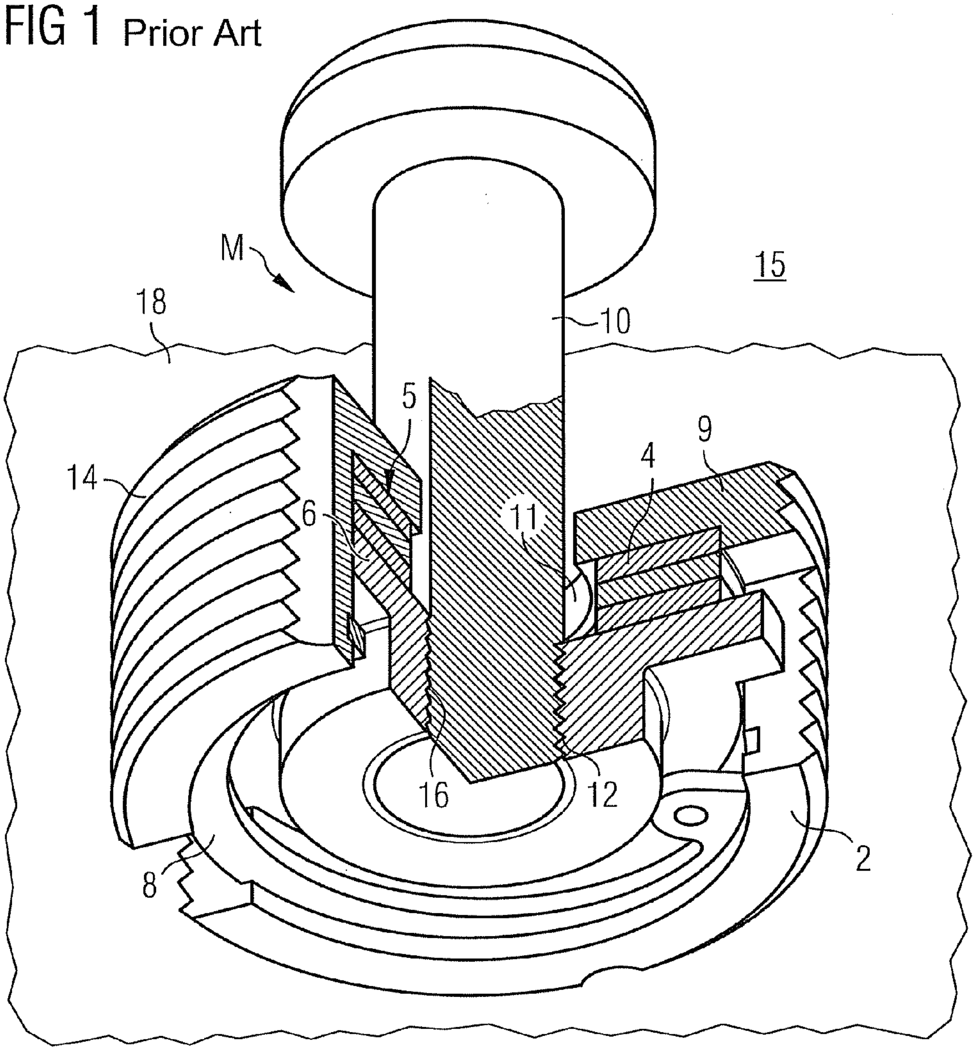
FIG 1 Prior Art
FIG. 1 shows a cup-spring assembly according to the prior art.

FIG. 1 shows a cup-spring assembly 5 according to the prior art. This has an axial hole 11 in the center on the inside, which can accommodate a screw 10. The heat shield (not shown) to be attached is arranged on the screw head. The cup-spring assembly 5 has a sleeve 2 with an external thread 14. This sleeve is screwed into the support structure 18 using the corresponding internal thread. A pressure plate 6 and one or more cup springs 4 are positioned in the sleeve 2. The pressure plate 6 has an internal thread 16, into which the thread 12 of the screw 10 can be screwed. So that this does not fall into the support structure 18, a removable security ring 8 is positioned on the side facing away from the combustion chamber 15. So that the cup springs 4 do not fall into the combustion chamber when the heat shield is being taken down/mounted, a sealing cover 9, also with the axial hole 11, is positioned permanently on the sleeve 2. The sealing cover 9 is hereby part of the sleeve 2 itself. The cup-spring assembly 5 cannot therefore open toward the combustion chamber 15. If the security ring 8 fractures, for example when a heat shield to be replaced is being taken down/mounted, the cup-spring assembly 5 must therefore be taken down from the support structure side 18, which takes a long time. Otherwise the security ring 8, cup springs 4 or parts of the sleeve 2 may fall into the combustion chamber. Since these cause tremendous damage in the combustion chamber 15, they have to be located and removed in a time-consuming operation.

Figure 2:
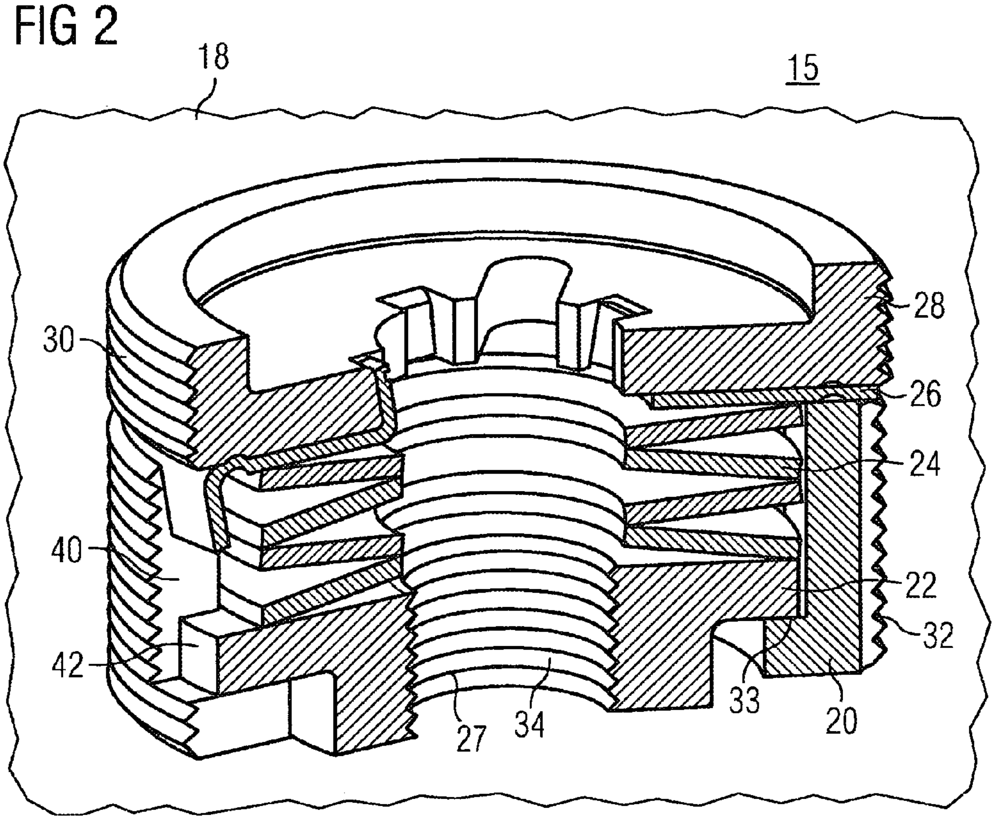
FIG. 2 shows a spring device according to the invention, incorporated into the support.
Figure 3:
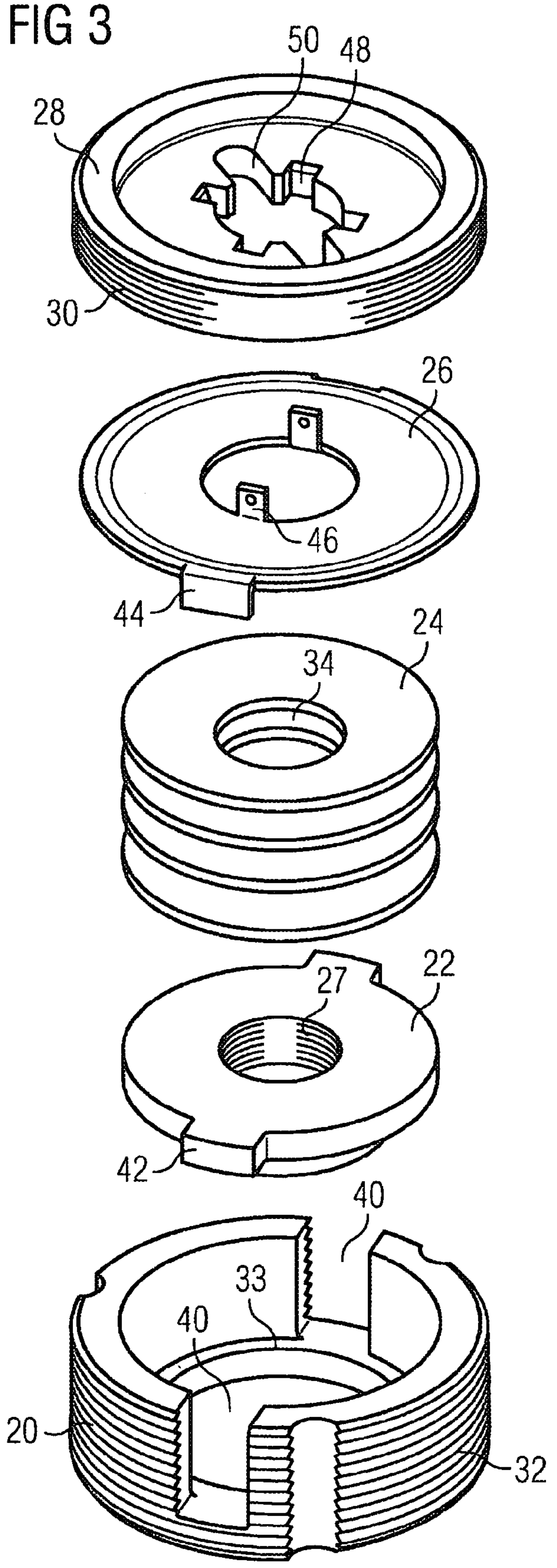
FIG. 3 shows a spring device according to the invention.

FIGS. 2 and 3 show a spring device according to the invention. The spring device, which is essentially round here and has cup springs 24 as its springs, can be dismantled toward the interior of the combustion chamber 15. The spring device has an axial hole 34 on the inside, preferably in the center.

The spring device consists of a sleeve 20 configured as a jacket. This has an external thread 32, which is screwed into the corresponding internal thread of the support structure 18.

The sleeve 20 also has recesses 40 on the side facing the combustion chamber 15 and an edge 33 on the side facing away from the combustion chamber 15. A round pressure plate 22 is now inserted into this sleeve, in such a manner that it rests on the edge 33 of the sleeve 20. The pressure plate 22 has two but at least one projection 42 directed outward. These projections 42 are inserted into the recess 40 in the sleeve 20. This means on the one hand that the pressure plate 22 is held more securely and on the other hand it secures the pressure plate 22 against twisting. An internal thread 27 is incorporated in the pressure plate, embodied here as a supporting internal thread 27. This fastens the fastening means to the support structure 18. The heat shield (not shown) is mounted at the other end of the fastening means. The spring, here the cup spring 24 or cup springs 24, is now arranged on the pressure plate 22 in the sleeve 20. A security sheet 26 is now arranged on the cup springs 24. The security sheet 26 can hereby be arranged in the sleeve 20 still or already outside the sleeve 20. This has an attachment 44 on the outer edge. This attachment 44 is inserted into the recess 40 in the sleeve 20. On the one hand this avoids the risk of twisting; on the other hand this attachment 44 holds the two components—the security sheet 26 and the cup springs 24—together more securely. The security sheet 26 also has a further assembly 46 on the inside. A disk 28 is arranged on the security sheet 26. This has recesses 48 on the inside, into which the assembly 46 of the security sheet 26 is inserted. This also serves as protection against twisting and/or misalignment and additionally helps to hold the components—the disk 28 and security sheet 26—together more securely. The disk 28 has a supporting external thread 30. Like the sleeve 20, the external thread is screwed into the corresponding internal thread of the support structure 18. The disk can be provided with a slot 50, so that it can be screwed on and in more easily.

This produces a sort of cover consisting of a disk 28 with a security sheet 26, it being possible to unscrew the disk 28 toward the interior of the combustion chamber. The unscrewable disk 28 has the advantage of dispensing with the need for subsequent machining at the so-called plate journal to tailor the heat shield to the support structure 18, in that the height of the spring device can be adjusted individually. Ease of dismantling is achieved in that the jacket, configured here as a sleeve 20, can now be dismantled on the combustion chamber side.

Figure 4:
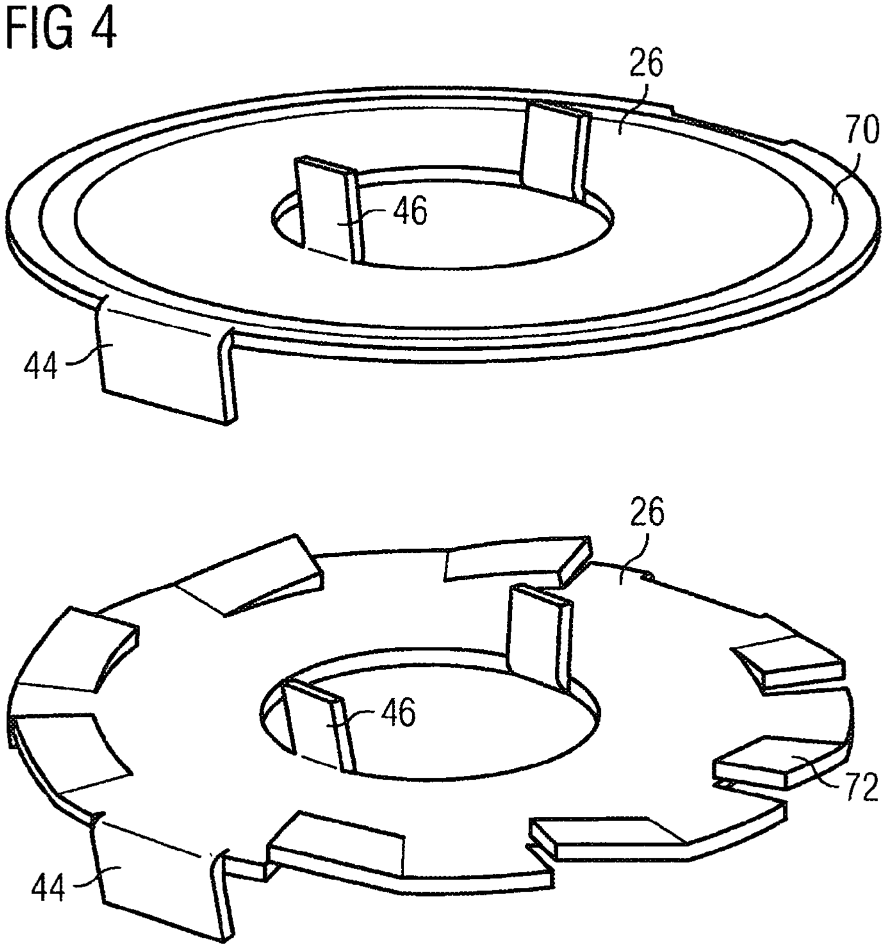
FIG. 4 shows two security sheets according to the invention.

FIG. 4 shows different embodiments of the security sheet 26. Different variants are possible for securing the disk 28. For example it can be a securing sheet 26 with teeth 72 or a securing sheet 26 with an impressed bead 70. The teeth 72 in the securing sheet 26 and/or the impressed bead 70 prevent(s) the cup springs 24 and the spring device rattling in the thread. This prevents wear in the thread due to relative movement.

According to the invention the necessary user-friendliness is essentially achieved by the possibility of carrying out replacement operations to the combustion chamber side. This compensates for the disadvantage that the cup-spring assembly illustrated in the prior art cannot be taken down or mounted on the side facing the combustion chamber. This prevents cup springs and/or the pressure plate falling into the combustion chamber when a heat shield fractures and is taken down/mounted. The spring device can now be replaced directly when the heat shield is replaced.

The invention claimed is:

1. A combustion chamber wall having a combustion chamber, comprising:
- a support structure;
- a spring device comprised in the fastening unit that is connected to the support structure;
- an axial hole on an inside of the spring device that accommodates the fastening unit;
- a spring comprised in the spring device that is positioned in a jacket;
- a first captive securing unit that secures the spring on a side facing away from the combustion chamber in an axial direction of the axial hole to prevent the spring falling out; and
- a second captive securing unit that secures the spring on a side facing the combustion chamber in the axial direction of the axial hole to prevent the spring falling out,
- wherein the spring device is configured to be dismantled on the side facing the combustion chamber,
- wherein a securing sheet is positioned on the spring on the side facing the combustion chamber in the axial direction of the axial hole,
- wherein a tooth is positioned on the securing sheet on an outer edge on the side facing the combustion chamber in the axial direction of the axial hole.

2. The combustion chamber wall as claimed in claim 1, wherein the axial hole is continuous.

3. The combustion chamber wall as claimed in claim 1, wherein the spring device is round.

4. The combustion chamber wall as claimed in claim 1, wherein the spring is a cup spring.

5. The combustion chamber wall as claimed in claim 1, wherein the first captive securing unit is a pressure plate or an edge positioned on an inside of the jacket.

6. The combustion chamber wall as claimed in claim 5, wherein the pressure plate is positioned between the edge and the spring in the jacket.

7. The combustion chamber wall as claimed in claim 5, wherein the pressure plate comprises a projection.

8. The combustion chamber wall as claimed in claim 5, wherein the pressure plate has an internal thread for fastening the fastening unit.

9. The combustion chamber wall as claimed in claim 1, wherein the jacket comprises an external thread.

10. The combustion chamber wall as claimed in claim 1, wherein the jacket comprises a recess on the side facing the combustion chamber in the axial direction of the axial hole.

11. The combustion chamber wall as claimed in claim 1, wherein the jacket is a sleeve.

12. The combustion chamber wall as claimed in claim 1, wherein the securing sheet is connected to the jacket and comprises an attachment on an outside and an assembly on an inside.

13. The combustion chamber wall as claimed in claim 1, wherein a bead is impressed on the securing sheet on an outer edge on the side facing the combustion chamber in the axial direction of the axial hole.

14. The combustion chamber wall as claimed in claim 1, wherein a disk is positioned on the securing sheet on the side facing the combustion chamber in the axial direction of the axial hole.

15. The combustion chamber wall as claimed in claim 14, wherein the disk comprises an inside recess and an external thread.

16. The combustion chamber wall as claimed in claim 14, wherein the second captive securing unit comprises the securing sheet and the disk.

17. The combustion chamber wall as claimed in claim 1, wherein the fastening unit is a screw.

* * * * *